United States Patent
Konik et al.

(10) Patent No.: US 9,323,798 B2
(45) Date of Patent: Apr. 26, 2016

(54) STORING A KEY VALUE TO A DELETED ROW BASED ON KEY RANGE DENSITY

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/740,298

(22) Filed: Jan. 14, 2013

(65) Prior Publication Data

US 2014/0201132 A1 Jul. 17, 2014

(51) Int. Cl.
G06F 17/30 (2006.01)
(52) U.S. Cl.
CPC .................. *G06F 17/30345* (2013.01)
(58) Field of Classification Search
CPC ............. G06F 17/30595; G06F 17/30598; G06F 17/30371; G06F 17/30345; G06F 17/30286; G06F 17/30442
USPC ......... 707/609, 654, 713, 715, 718, 745, 758, 707/769
See application file for complete search history.

(56) References Cited

U.S. PATENT DOCUMENTS

| | | | |
|---|---|---|---|
| 6,366,901 B1 * | 4/2002 | Ellis | |
| 6,668,263 B1 * | 12/2003 | Cranston et al. | |
| 7,158,996 B2 * | 1/2007 | Croisettier et al. | 707/741 |
| 7,251,663 B1 * | 7/2007 | Smith | |
| 7,519,637 B2 * | 4/2009 | Shuma et al. | |
| 7,587,430 B2 | 9/2009 | Suzuki et al. | |
| 7,693,875 B2 * | 4/2010 | Hrle et al. | 707/758 |
| 8,856,193 B2 * | 10/2014 | Mueller | 707/809 |
| 2004/0225673 A1 * | 11/2004 | Beck et al. | 707/102 |
| 2006/0041544 A1 * | 2/2006 | Santosuosso | 707/4 |
| 2006/0155915 A1 * | 7/2006 | Pereira | 711/100 |
| 2008/0040406 A1 * | 2/2008 | Maxfield | 707/205 |
| 2008/0134111 A1 * | 6/2008 | Abbott et al. | 716/4 |
| 2009/0144235 A1 * | 6/2009 | Bhide et al. | 707/3 |

(Continued)

OTHER PUBLICATIONS

Designing > Physical Database Design, http://publib.boulder.ibm.com/infocenter/db2luw/v9/topic/com.ibm.db2.udb.admin.doc/doc/c0011052.htm, Oct. 27, 2006, p. 1 of 1.

(Continued)

*Primary Examiner* — Christyann Pulliam
*Assistant Examiner* — Jedidiah Ferrer
(74) *Attorney, Agent, or Firm* — Owen J. Gamon; Roy W. Truelson

(57) ABSTRACT

In an embodiment, a first key value is received. A plurality of candidate rows are found in a database table, wherein the plurality of candidate rows are deleted. For the plurality of candidate rows, a plurality of respective impacts on a plurality of respective densities of each of other key values that are stored within a first key range of the first key value are calculated. For the plurality of candidate rows, a plurality of function results of the plurality of respective impacts on the plurality of respective densities are calculated. A selected candidate row of the plurality of candidate rows with a smallest function result of the plurality of function results of the plurality of respective impacts on the plurality of respective densities is selected. The first key value is stored to the selected candidate row.

16 Claims, 12 Drawing Sheets

(56) References Cited

U.S. PATENT DOCUMENTS

| | | |
|---|---|---|
| 2009/0287637 A1 | 11/2009 | Day et al. |
| 2009/0287639 A1 | 11/2009 | Day et al. |
| 2010/0281013 A1 | 11/2010 | Graefe |
| 2012/0117067 A1* | 5/2012 | Yakubovich et al. ......... 707/737 |
| 2012/0254199 A1* | 10/2012 | Kuno et al. .................. 707/752 |
| 2013/0166557 A1* | 6/2013 | Fricke et al. .................. 707/737 |

OTHER PUBLICATIONS

Stratos Idreos et al., "Updating a Cracked Database," http://www.intelligence.tuc.gr/~sidraios/IKM_SIGMOD07.pdf, SIGMOD '07, Jun. 11-14, 2007, pp. 1-12, Beijing, China.

* cited by examiner

*┌260-1*

| SYMBOL TABLE FOR COLUMN X.CITY | | | | | |
|---|---|---|---|---|---|
| KEY VALUE | FIRST RRN | LAST RRN | DELETED COUNT | KEY COUNT | RRN DENSITY |
| ALBERT LEA | 2 | 46 | 11 | 4 | 8.5 |
| AUSTIN | 1 | 23 | 16 | 5 | 1.4 |
| BYRON | 11 | 20 | 4 | 3 | 2 |
| ROCHESTER | 12 | 47 | 6 | 15 | 2 |
| STEWARTVILLE | 48 | 55 | 6 | 2 | 1 |

FIG. 4

SYMBOL TABLE FOR COLUMN X.STATE — 260-2

| KEY VALUE | FIRST RRN | LAST RRN | DELETED COUNT | KEY COUNT | RRN DENSITY |
|---|---|---|---|---|---|
| MN | 1 | 55 | 11 | 32 | 1.38 |
| WI | 4 | 5 | 0 | 2 | 1 |
| NY | 47 | 47 | 0 | 1 | 1 |

| SYMBOL TABLE FOR COLUMNS X.CITY AND X.STATE | | | | | |
|---|---|---|---|---|---|
| KEY VALUES (610) | FIRST RRN (612) | LAST RRN (614) | DELETED COUNT (616) | KEY COUNT (618) | RRN DENSITY (620) |
| ALBERT LEA, MN | 2 | 46 | 11 | 4 | 8.5 |
| AUSTIN, MN | 1 | 22 | 15 | 4 | 1.75 |
| BYRON, MN | 11 | 20 | 4 | 3 | 2 |
| ROCHESTER, MN | 16 | 47 | 5 | 12 | 2.25 |
| STEWARTVILLE, MN | 48 | 55 | 6 | 2 | 1 |
| ROCHESTER, NY | 12 | 17 | 1 | 3 | 1.67 |
| AUSTIN, TX | 23 | 23 | 0 | 1 | 1 |

FIG. 6

SYMBOL TABLE FOR COLUMN X.CITY — 260-4

| KEY VALUE | FIRST RRN | LAST RRN | DELETED COUNT | KEY COUNT | RRN DENSITY | |
|---|---|---|---|---|---|---|
| AUSTIN | 1 | 9 | 2 | 2 | 3.5 | 830 |
| ALBERT LEA | 3 | 16 | 4 | 5 | 2 | 832 |
| BYRON | 11 | 20 | 2 | 4 | 2 | 834 |
| STEWARTVILLE | 17 | 19 | 1 | 2 | 1 | 836 |

FIG. 8

SYMBOL TABLE FOR COLUMN X.CITY — 260-5

| KEY VALUE (1000) | FIRST RRN (1012) | LAST RRN (1014) | DELETED COUNT (1016) | KEY COUNT (1018) | RRN DENSITY (1020) | |
|---|---|---|---|---|---|---|
| AUSTIN | 1 | 9 | 2 | 2 | 3.5 | 1030 |
| ALBERT LEA | 3 | 16 | 3 | 6 | 1.83 | 1032 |
| BYRON | 11 | 20 | 2 | 4 | 2 | 1034 |
| STEWARTVILLE | 17 | 19 | 1 | 2 | 1 | 1036 |

FIG. 10

STORING A KEY VALUE TO A DELETED ROW BASED ON KEY RANGE DENSITY

FIELD

This invention generally relates to computer database management systems and more specifically relates to database management systems that insert key values into available rows of a database table.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, keys, fields, or attributes, which define what is stored in each entry, tuple, or record. The data stored in the columns of the rows are known as key values. Each table has a unique name or identifier within the database and each column has a unique name within the particular table. The database also has one or more indexes, which are data structures that inform the DBMS of the location of a certain row in a table given an indexed column value, analogous to a book index informing the reader of the page on which a given word appears.

SUMMARY

A method, computer-readable storage medium, and computer system are provided. In an embodiment, a first key value is received. A plurality of candidate rows are found in a database table, wherein the plurality of candidate rows are deleted. For the plurality of candidate rows, a plurality of respective impacts on a plurality of respective densities of each of other key values that are stored within a first key range of the first key value are calculated. For the plurality of candidate rows, a plurality of function results of the plurality of respective impacts on the plurality of respective densities are calculated. A selected candidate row of the plurality of candidate rows with a smallest function result of the plurality of function results of the plurality of respective impacts on the plurality of respective densities is selected. The first key value is stored to the selected candidate row.

BRIEF DESCRIPTION OF THE SEVERAL VIEWS OF THE DRAWINGS

FIG. 4 depicts a block diagram of an example data structure for a symbol table, according to an embodiment of the invention.

FIG. 5 depicts a block diagram of an example data structure for another symbol table, according to an embodiment of the invention.

FIG. 6 depicts a block diagram of an example data structure for another symbol table, according to an embodiment of the invention.

FIG. 8 depicts a block diagram of an example data structure for a symbol table before insertion of a value into the database, according to an embodiment of the invention.

FIG. 10 depicts a block diagram of an example data structure for a symbol table after insertion of a value into the database, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
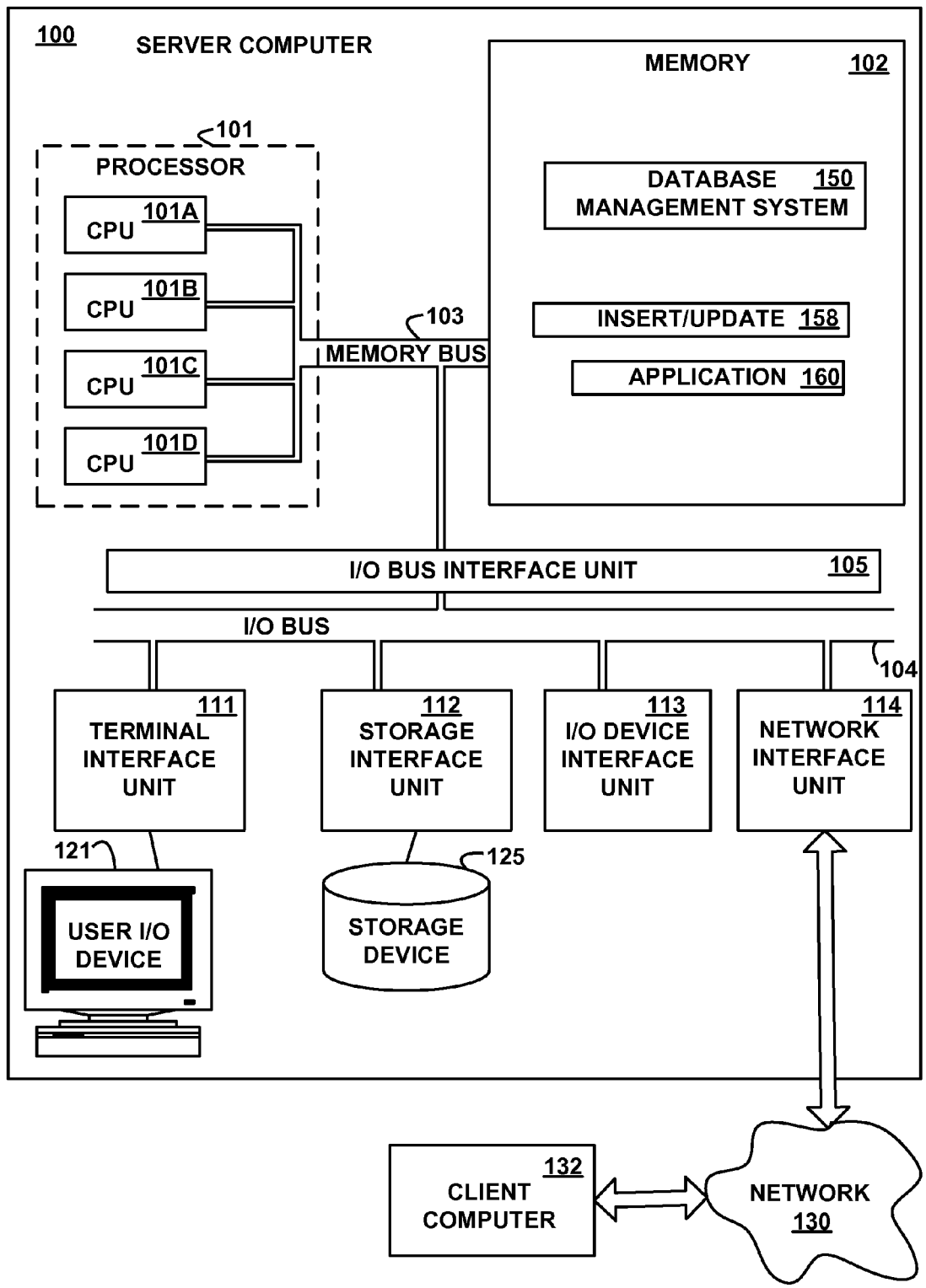
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanism and apparatus of embodiments of the present invention apply equally to any appropriate computing system.

The major components of the server computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system (DBMS) 150, an insert or update command 158, and an application 160. Although the database management system 150, the insert/update command 158, and the application 160 are illustrated as being contained within the memory 102 in the server computer system 100, in other embodiments some or all of them may be on different computer systems and may be accessed remotely, e.g., via the network 130. For example, the database management system 150, the insert/update command 158, and the application 160 may be stored in memory in the client computer system 132. The server computer system 100 may use virtual addressing mechanisms that allow the programs of the server computer system 100 to behave as if they only have access to a large, single storage entity instead of access to multiple, smaller storage entities. Thus, while the database management system 150, the insert/update command 158, and the application 160 are illustrated as being contained within the memory 102, these elements are not necessarily all completely contained in the same storage device at the same time. Further, although the database management system 150, the insert/update command 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, 10, 11, and 12. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data, in addition to instructions or statements.

The memory bus 103 provides a data communication path for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and client computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the client computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In an embodiment, the application 160 may be stored in a storage device at the client computer system 132, may execute on a processor at the client computer system 132, and may send the insert/update commands 158 to the server computer system 100 via the network 130.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
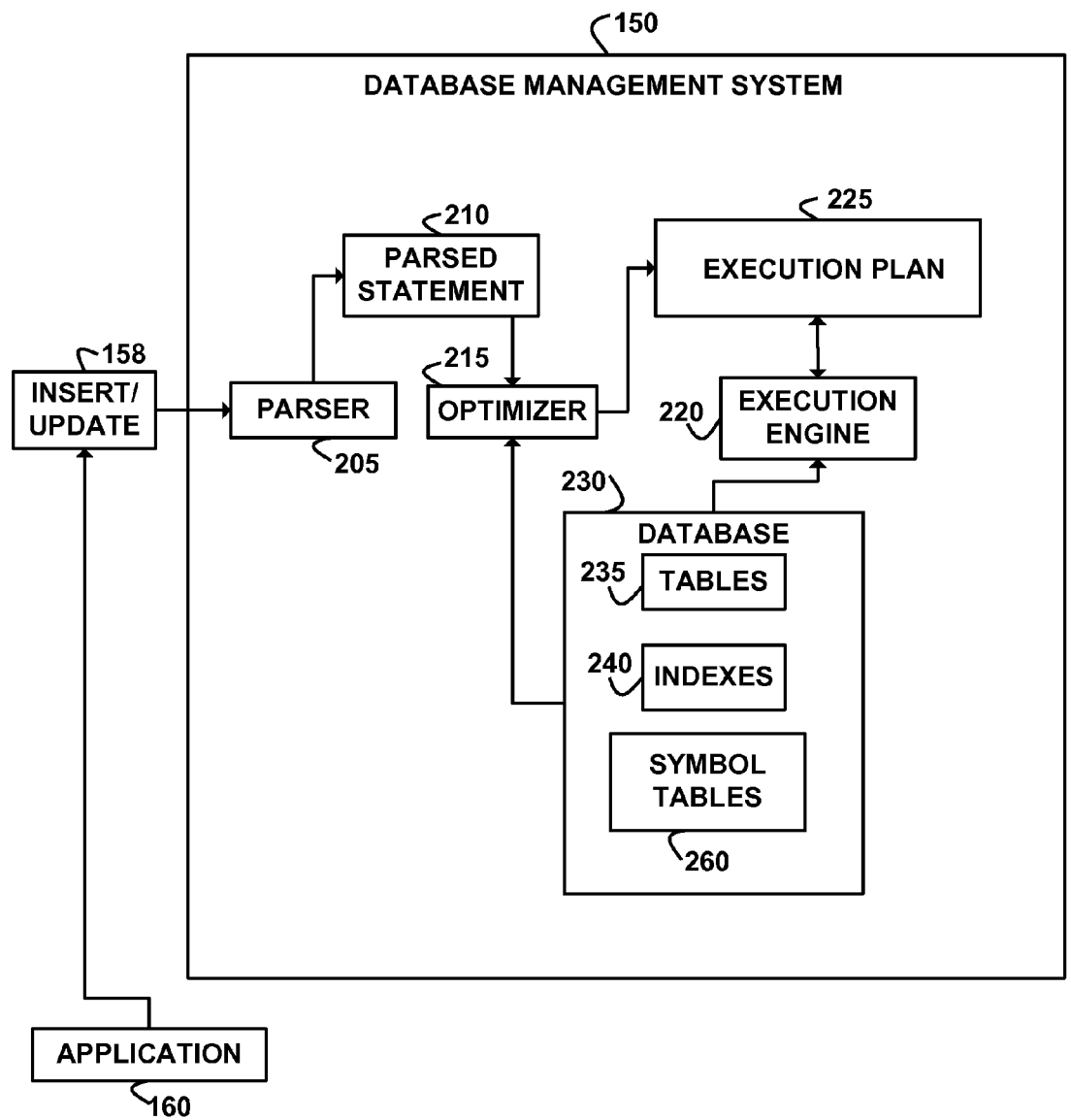
FIG. 2 depicts a block diagram of an example database management system, according to an embodiment of the invention.

FIG. 2 depicts a block diagram of an example database management system 150, according to an embodiment of the invention. The DBMS 150 comprises a parser 205, a parsed statement 210, an optimizer 215, an execution engine 220, an execution plan 225, and a database 230.

The database 230 comprises tables 235, optional indexes 240, and symbol tables 260. The tables 235 organize data in rows, which represent individual entries, tuples, or records and columns, keys, fields, or attributes, which define what is stored in each row, entry, tuple, or record. Each table 235 has a unique name or identifier within a database 230 (but not necessarily a unique name across all databases) and each column has a unique name within the particular table 235. The indexes 240 are data structures that inform the DBMS 150 of the location of a certain row in a table 235, in response to the indexes 240 receiving an indexed column value.

The parser 205 in the DBMS 150 receives the insert/update command 158 from the application 160. The insert command 158 requests that the DBMS 150 insert or store a row or rows of data to a table or tables 235. In another embodiment, an update command 158 requests that the DBMS 150 modify the value of an existing row in the table 235. The parser 205 generates a parsed statement 210 from the insert/update command 158, which the parser 205 sends to the optimizer 215. The optimizer 215 performs optimization on the parsed statement 210. As a part of optimization, the optimizer 215 generates one or more execution plans 225.

The execution engine 220 reads the execution plan 225 and executes the selected execution plan 225 to insert or update the data specified by the insert/update command 158. The execution engine 220 optionally using the indexes 240, in order to find the appropriate row of data in the tables 235 to modify or update. The optimizer 215 and/or the execution engine 220 use the symbol tables 260 to determine a deleted, free, or available row, in which to insert the data into the tables 235 and to move rows within the tables 235.

Figure 3:
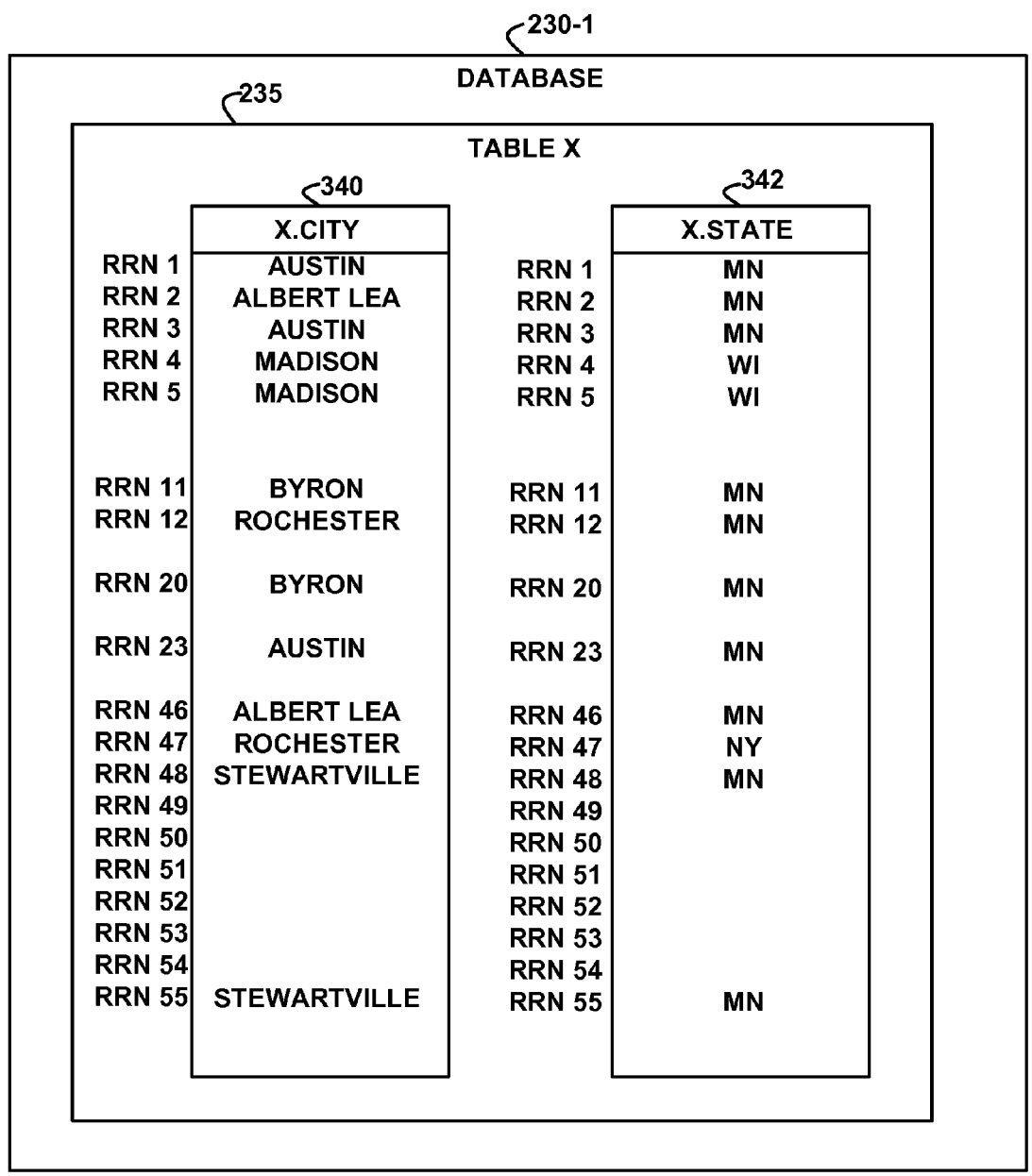
FIG. 3 depicts a block diagram of an example database, according to an embodiment of the invention.

FIG. 3 depicts a block diagram of an example database 230-1, according to an embodiment of the invention. The database 230-1 is an example of, and is generically referred to by, the database 230 (FIG. 2). The example database 230-1 comprises an example table X 235, which comprises example keys, fields, or columns 340 and 342, each of which stores rows of key values at relative record numbers (RRNs). The RRNs are the address or offset of their respective rows from the start of the table X 235, in sequential address order. In various embodiments, the RRNs may be present as a field or fields in the table X 235 or may exist as addresses or offsets of locations in memory. The key values in the columns that have the same RRN are in the same row and the key values in the columns that have different RRNs are in different rows. The RRNs "49," "50," "51," "52," "53," and "54" are deleted, free, or available for use and do not contain valid key values. Although the deleted RRNs "49," "50," "51," "52," "53," and "54" are illustrated as containing no key values (being blank), in other embodiments, they may contain data, but a flag or indicator is set to indicate that the key values are deleted or invalid, and the rows are available or free for the DBMS 150 to insert data into the deleted rows.

FIG. 4 depicts a block diagram of an example data structure for a symbol table 260-1, according to an embodiment of the invention. The symbol table 260-1 is an example of, and is generically referred to by, the symbol table 260 (FIG. 2). The symbol table 260-1 comprises any number of entries, each of which comprises example fields, such as the key value field 410, the first RRN field 412, the last RRN field 414, the deleted count field 416, the key count field 418, and the RRN density field 420.

The key value field 410, in each entry, identifies the key value in the column that is assigned to the symbol table 260-1, which in this example is the column x.city 340. The first RRN field 412, in each entry, identifies the relative record number of the first row (in relative record number order) in the database table assigned to the symbol table 260-1 (which in this example is the table X 235) that contains the key value specified by the key value 410, in the same entry. For example, no rows in the column x.city 340 prior to the first RRN 412 of "2" contain the key value "Albert Lea." The last RRN field 414, in each entry, identifies the relative record number of the last row (in relative record number order) in the database table assigned to the symbol table 260-1 (which in this example is the table x 235) that contains the key value specified by the key value 410, in the same entry. For example, no rows in the column x.city 340 after the last RRN 414 of "46" contain the key value "Albert Lea." Thus, the first RRN 412 and the last RRN 414 specify the key range of rows in the table x 235 that may, but do not necessarily, contain the key value specified in the same entry, and no rows outside of that key range contain the key value in the key value field 410, in the same entry. The ranges of different key values may overlap, meaning that, in an embodiment, the first RRN 412 of a first key value may be less than the first RRN 412 of a second key value while the last RRN 414 of the first key value may be between the first RRN 412 and the last RRN 414 of the second key value. The ranges of key values may also overlap, meaning that, in an embodiment, the first RRN 412 of a first key value may be less than the first RRN 412 of a second key value while the last RRN 414 of the first key value may be greater than the last RRN 414 of the second key value. The ranges of different key values may also not overlap, meaning that the first RRN 412 and the last RRN 414 of a first key value may both be less than the first RRN 412 of a second key value. Thus, a key range for a particular key value comprises all of the rows that comprise that particular key value plus zero, one, or more deleted (free or available) rows, plus zero, one, or more rows that comprise another key value or values.

The deleted count field 416 specifies the number of rows (in the column assigned to the symbol table 260-1, which in this example is the column x.city 340) whose relative record numbers are between the first RRN 412 and the last RRN 414, in the same entry, and that are deleted, are available, or are free (contain no key value). The key count field 418, in each entry, specifies the number of rows (in the column assigned to the symbol table 260-1, which in this example is the column x.city 340) whose relative record numbers are between the first RRN 412 and the last RRN 414, in the same entry, and that contain the key value 410, in the same entry.

The RRN density field 420, in each entry specifies the density of the rows that contain the key value 410, in the same entry, within the key range specified by the first RRN 412 and the last RRN 414, in the same entry. In an embodiment, the DBMS 150 calculates the RRN density 420 to be equal to (last RRN 414–first RRN 412+1–deleted count 416)/key count 418, in each entry. Thus, the RRN density 420 for a particular key value 410 specified by an entry is the number of rows in the key range of that particular key value that contain some key value (are not deleted and contain either the key value 410 specified by the entry or some other key value specified by some other entry) divided by the number of rows in the key range that comprise the key value 410 specified by the entry.

FIG. 5 depicts a block diagram of an example data structure for another symbol table 260-2, according to an embodiment of the invention. The symbol table 260-2 is an example of, and is generically referred to by, the symbol table 260 (FIG. 2). The symbol table 260-2 comprises any number of entries, each of which comprises example fields, such as the key value field 510, the first RRN field 512, the last RRN field 514, the deleted count field 516, the key count field 518, and the RRN density field 520.

The key value field 510, in each entry, identifies the key value in the column that is assigned to the symbol table 260-2, which in this example is the column x.state 342. The first RRN field 512, in each entry, identifies the relative record number of the first row (in relative record number order) in the database table assigned to the symbol table 260-2 (which in this example is the table X 235) that contains the key value specified by the key value 510, in the same entry. For example, no rows in the column x.state 342 prior to the first RRN 512 of "4" contain the key value "WI." The last RRN field 514, in each entry, identifies the relative record number of the last row (in relative record number order) in the database table assigned to the symbol table 260-2 (which in this example is the table x 235) that contains the key value specified by the key value 510, in the same entry. For example, no rows in the column x.state 342 after the last RRN 514 of "5" contain the key value "WI."

The deleted count field 516 specifies the number of rows (in the column assigned to the symbol table 260-2, which in this example is the column x.state 342) whose relative record numbers are between the first RRN 512 and the last RRN 514, in the same entry, and that are deleted, are available, or are free (contain no key value). The key count field 518, in each entry, specifies the number of rows (in the column assigned to the symbol table 260-2, which in this example is the column x.state 342) whose relative record numbers are between the first RRN 512 and the last RRN 514, in the same entry, and that contain the key value 510, in the same entry.

The RRN density field 520, in each entry specifies the density of the rows that contain the key value 510, in the same entry, within the key range specified by the first RRN 512 and the last RRN 514, in the same entry. In an embodiment, the DBMS 150 calculates the RRN density 520 to be equal to (last RRN 515–first RRN 515+1–deleted count 516)/key count 518, in each entry. Thus, the RRN density 520 for a particular key value 510 specified by an entry is the number of rows in the key range of that particular key value that contain some key value (are not deleted and contain either the key value 510 specified by the entry or some other key value specified by some other entry) divided by the number of rows in the key range that comprise the key value 510 specified by the entry.

FIG. 6 depicts a block diagram of an example data structure for a symbol table 260-3, according to an embodiment of the invention. The symbol table 260-3 is an example of, and is generically referred to by, the symbol table 260 (FIG. 2). The symbol table 260-3 is assigned to multiple columns of the database table x 235, which in this example are the x.city column 340 and the x.state column 342, and a multi-key index over both of the x.city column 340 and the x.state column 342 exists. A symbol table 260 that is assigned to multiple columns may be useful in embodiments where a key value in one column has multiple different key values in multiple rows in another column. For example, FIG. 3 illustrates that the key value of "Rochester" in the x.city column 340 has "MN" in the x.state column 342 in RRN "12," but "Rochester" in the x.city column 340 has "NY" in the x.state column 342 in RRN "47."

The symbol table 260-3 comprises any number of entries, each of which comprises example fields, such as the key values field 610, the first RRN field 612, the last RRN field 614, the deleted count field 616, the key count field 618, and the RRN density field 620.

The key values field 610, in each entry, identify the key values in the columns that are assigned to the symbol table 260-3, which in this example are the columns x.city 340 and the column x.state 342. The first RRN field 612, in each entry, identifies the relative record number of the first row (in relative record number order) in the database table assigned to the symbol table 260-3 (which in this example is the table X 235) that contains the key values specified by the key values 610, in the columns assigned to the symbol table 260-3, in the same entry. For example, no rows in the table X 235 prior (in RRN order) to the first RRN 612 of "16" contain both the key value "Rochester" in the x.city column 340 and the key value "MN" in the x.state column 342. The last RRN field 614, in each entry, identifies the relative record number of the last row (in relative record number order) in the database table assigned to the symbol table 260-3 (which in this example is the table X 235) that contains the key values specified by the key values 610, in the columns assigned to the symbol table 260-3, in the same entry. For example, no rows in the table X 235 after (in RRN order) the last RRN 614 of "47" contain both the key value "Rochester" in the x.city column 340 and the key value "MN" in the x.state column 342.

The deleted count field 616 specifies the number of rows (in the columns assigned to the symbol table 260-3, which in this example are the column x.city 340 and the column x.state 342) whose relative record numbers are between the first RRN 612 and the last RRN 614, in the same entry, and that are deleted, are available, or are free (contain no valid key value). The key count field 618, in each entry, specifies the number of rows (in the columns assigned to the symbol table 260-3) whose record numbers are between the first RRN 612 and the last RRN 614, in the same entry, and that contain both of the key values specified by the key values 610, in the same entry.

The RRN density field 620, in each entry specifies the density of the rows that contain the key values 610, in the same entry, within the key range specified by the first RRN 612 and the last RRN 614, in the same entry. In an embodiment, the DBMS 150 calculates the RRN density 620 to be equal to (last RRN 615−first RRN 615+1−deleted count 616)/key count 618, in each entry. Thus, the RRN density 620 for particular key values 610 specified by an entry is the number of rows in the key range of that particular key value that contain some key value (are not deleted and contain either the key values 610 specified by the entry or some other key value specified by some other entry) divided by the number of rows in the key range that comprise the key values 610 specified by the entry.

Figure 7:
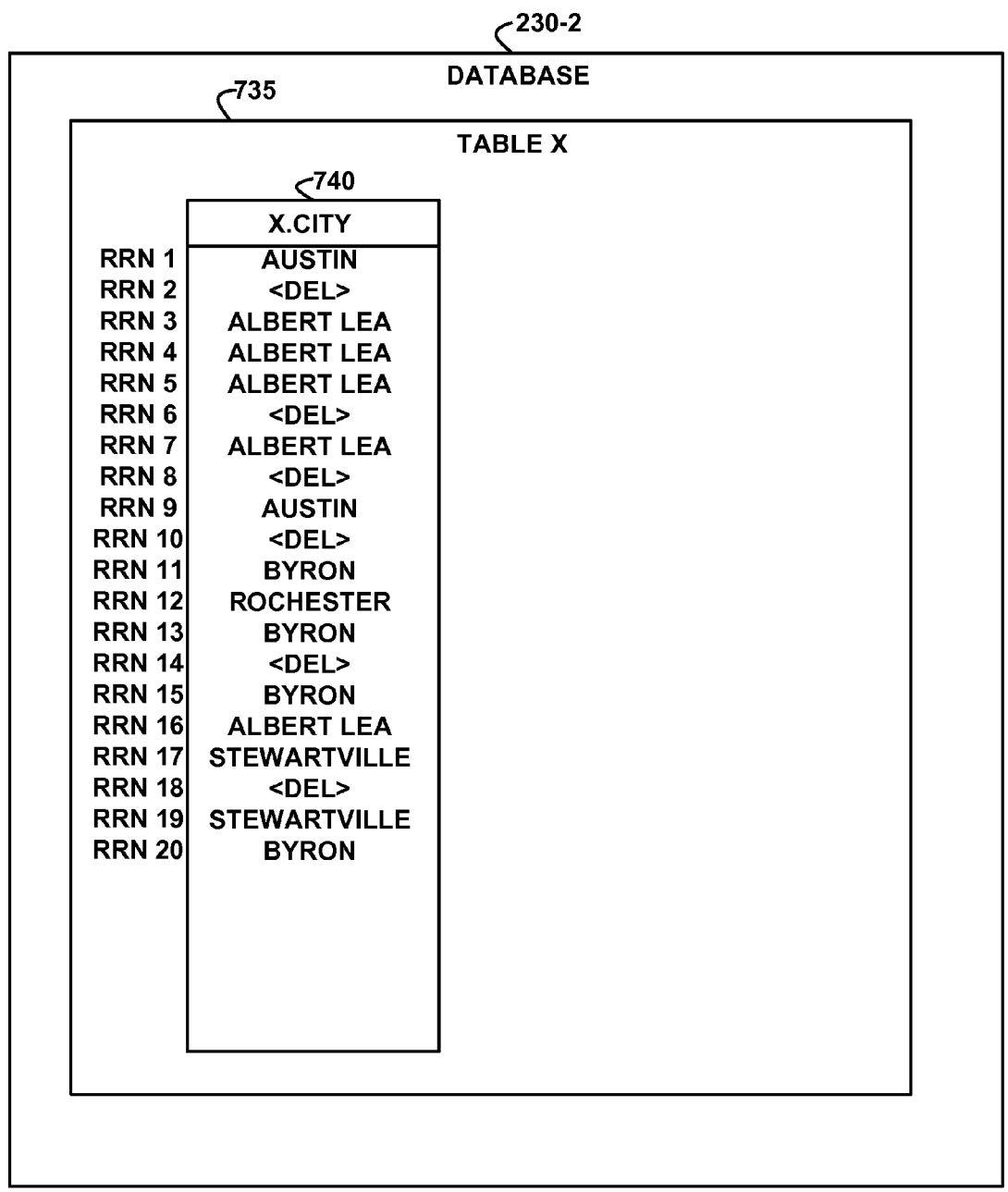
FIG. 7 depicts a block diagram of an example database before insertion of a value, according to an embodiment of the invention.

FIG. 7 depicts a block diagram of an example database 230-2 before insertion of a value, according to an embodiment of the invention. The database 230-2 is an example of, and is generically referred to by, the database 230 (FIG. 2). The example database 230-2 comprises an example table X 735, which comprises an example key, field, or column 740, which stores rows of key values at relative record numbers (RRNs). The RRNs are the address or offset of their respective rows from the start of the table X 735, in sequential address order. In various embodiments, the RRNs may be present as a field or fields in the table X 735 or may exist as addresses or offsets of locations in memory. The RRNs "2," "6," "8," "10," "14," and "18" are deleted, free, or available for use and do not contain valid key values. Although the deleted RRNs "2," "6," "8," "10," "14," and "18" are illustrated as containing "<del>", in other embodiments, they may contain data, but a flag or indicator is set to indicate that the key values are deleted or invalid, and the rows are available or free for the DBMS 150 to insert data into the deleted rows.

FIG. 8 depicts a block diagram of an example data structure for a symbol table 260-4 before insertion of a value into the database 230-2 (FIG. 7), according to an embodiment of the invention. The symbol table 260-4 is an example of, and is generically referred to by, the symbol table 260 (FIG. 2). The symbol table 260-4 comprises any number of entries, such as the entries 830, 832, 834, and 836, each of which comprises example fields, such as the key value field 810, the first RRN field 812, the last RRN field 814, the deleted count field 816, the key count field 818, and the RRN density field 820.

The key value field 810, in each entry, identifies the key value in the column that is assigned to the symbol table 260-4, which in this example is the column x.city 740 of FIG. 7. The first RRN field 812, in each entry, identifies the relative record number of the first row (in relative record number order) in the database table assigned to the symbol table 260-4 that contains the key value specified by the key value 810, in the same entry. The last RRN field 814, in each entry, identifies the relative record number of the last row (in relative record number order) in the database table assigned to the symbol table 260-4 that contains the key value specified by the key value 810, in the same entry. Thus, the first RRN 812 and the last RRN 814 specify the key range of rows in the table X 735 that may, but do not necessarily, contain the key value in the key value field 810 specified in the same entry, and no rows outside of that key range contain the key value in the key value field 810, in the same entry.

The deleted count field 816 specifies the number of rows (in the column assigned to the symbol table 260-4, which in this example is the column x.city 740) whose relative record numbers are between the first RRN 812 and the last RRN 814, in the same entry, and that are deleted, are available, or are free (contain no valid key value). The key count field 818, in each entry, specifies the number of rows (in the column assigned to the symbol table 260-4) whose relative record numbers are between the first RRN 812 and the last RRN 814, in the same entry, and that contain the key value specified in the key value field 810, in the same entry.

The RRN density field 820, in each entry, specifies the density of the rows that contain the key value in the key value field 810, in the same entry, within the key range specified by the first RRN 812 and the last RRN 814, in the same entry. In an embodiment, the DBMS 150 calculates the RRN density 820 to be equal to (the last RRN 814−the first RRN 812+1−the deleted count 816)/the key count 818, in each entry. Thus, the RRN density 820 for a particular key value 810 specified by an entry is the number of rows in the key range of that particular key value that contain some key value (are not deleted and contain either the key value 810 specified by the entry or some other key value specified by some other entry) divided by the number of rows in the key range that comprise the key value 810 specified by the entry.

Figure 9:
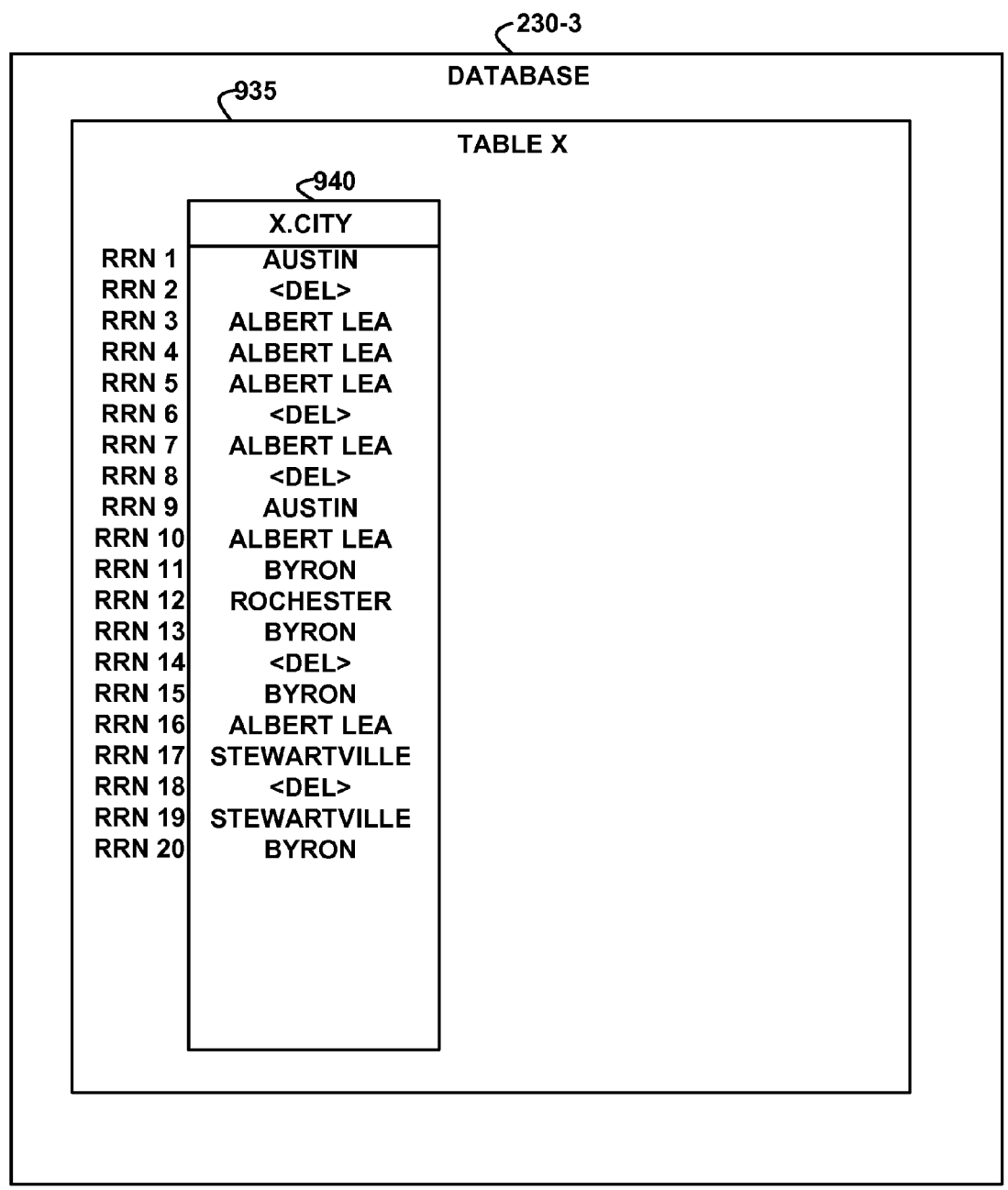
FIG. 9 depicts a block diagram of an example database after insertion of a value, according to an embodiment of the invention.

FIG. 9 depicts a block diagram of an example database 230-3 after insertion of a value "Albert Lea" into the row at RRN "10" of the database 230-2 (FIG. 7), according to an embodiment of the invention. The database 230-3 comprises a table 935, comprising column 940. In response to an insert command received by the DBMS 150, which requests that a value of "Albert Lea" be inserted into a row in the database 230-2 in the column x.city 740, the DBMS 150 selects the symbol table 260-4 that is assigned to the column x.city 740. The DBMS 150 then determines whether the deleted count 816 is greater than zero in the entry 832 that contains a key value 810 that matches the received value of "Albert Lea." That is, the DBMS 150 determines whether the key range of the received key value has any deleted rows. Since the deleted count 816 for the received key value of "Albert Lea" in the entry 832 is "4," which is greater than zero, the DBMS 150 finds all candidate rows, which are deleted rows that are within the key range specified by the entry 832. In other embodiments the DBMS 150 finds the candidate rows to be all deleted rows that are not within the key range specified by the entry 832 or selects candidate rows to be a sample of the deleted rows that are within the key range specified by the entry 832. In various embodiments, the sample size is set by a designer of the DBMS 150, is received from the application 160, is received from the user I/O device 121, or is received from the network 130. Using the example of FIGS. 7 and 8, the DBMS 150 determines the candidate rows to be the rows in the x.city column 740 of the database 230-2 with RRNs of "6," "8," "10," and "14" because these are the deleted rows that are within the "Albert Lea" key range, as specified by the first RRN field 812 and the last RRN field 814 in the entry 832 with the key value 810 of "Albert Lea."

The DBMS 150 then calculates, for each candidate row, the impact of potentially inserting the key value into the candidate row on the RRN density of each of the other key values (different from the received key value) that are stored within the key range of the received key value (the key ranges of the other key values overlap the key range of the received key value). The DBMS 150 then selects the deleted row, into which the potential insertion of the received key value causes the function result (in various embodiments, the function result is an arithmetic or logical function result, such as a sum, a maximum, an arithmetic product, a logarithmic function, or any combination or multiple thereof) of all the impacts on the calculated RRN densities to increase the least.

Using the example of FIGS. 7 and 8, the DBMS 150 calculates the impact of potentially inserting the received key of "Albert Lea" into the candidate row of RRN "6" as the potential RRN density of the "Austin" key range, as impacted by the potential insertion at RRN "6" minus the current RRN density 820 of the "Austin" key range (entry 830)=(last RRN of the "Austin" key range−first RRN of the "Austin" key range+1−deleted count of the "Austin" key range)/(key count of the "Austin" key range)−current density of the "Austin" key range=[(9−1+1−1)/2]−3.5=0.5. Thus, the potential insertion of "Albert Lea" into the RRN "6" impacts the RRN density of the "Austin" key range by reducing the number of deleted rows in the "Austin" key range by one and impacts the RRN density by increasing the RRN density by 0.5. The potential insertion of "Albert Lea" into RRN "6" on the "Byron" and "Stewartville" key ranges impacts their RRN densities by zero because the RRN "6" is outside of the "Byron" and "Stewartville" key ranges (the key ranges of "Byron" and "Stewartville" do not overlap the key range of "Albert Lea"), so the DBMS 150 adds zero to 0.5, to yield a sum of 0.5, as the sum of the impacts on the RRN density, of the potential insertion of the received key value at RRN "6."

Using the example of FIGS. 7 and 8, the DBMS 150 calculates the impact of potentially inserting the received key of "Albert Lea" into the candidate row of RRN "8" as the potential RRN density of the "Austin" key range, as impacted by the potential insertion at RRN "8" minus the current RRN density 820 of the "Austin" key range (entry 830)=(last RRN of the "Austin" key range−first RRN of the "Austin" key range+1−deleted count of the "Austin" key range)/(key count of the "Austin" key range)−the current density of the "Austin" key range=[(9−1+1−1)/2]−3.5=0.5. Thus, the potential insertion of "Albert Lea" into the RRN "8" impacts the RRN density of the "Austin" key range by reducing the number of deleted rows in the "Austin" key range by one and impacts the RRN density by increasing the RRN density by 0.5. The potential insertion of "Albert Lea" into RRN "8" on the "Byron" and "Stewartville" key ranges impacts their RRN densities by zero because the RRN "8" is outside of the "Byron" and "Stewartville" key ranges, so the DBMS 150 adds zero to 0.5, to yield a sum of 0.5, as the sum of the impacts on the RRN density, of the potential insertion of the received key value at RRN "8."

Using the example of FIGS. 7 and 8, the DBMS 150 calculates the impact of potentially inserting the received key of "Albert Lea" into the candidate row of RRN "10" as zero because the RRN "10" is outside the key ranges of "Austin," "Byron," and "Stewartville," the potential insertion at RRN "10" does not change the first RRN, the last RRN, the deleted count, or the key count of any of the key ranges, and the sum of the zero impacts is zero.

Using the example of FIGS. 7 and 8, the DBMS 150 calculates the impact of potentially inserting the received key of "Albert Lea" into the candidate row of RRN "10" as the sum of the impacts on the RRN density of the "Bryon" key range and the "Stewartville" key range.

The impact on the "Byron" key range is the potential RRN density of the "Byron" key range, as impacted by the potential insertion at RRN "10" minus the current RRN density 820 of the "Byron" key range (entry 834)=(last RRN of the "Byron" key range−first RRN of the "Byron" key range+1−deleted count of the "Byron" key range)/(key count of the "Byron" key range)−the current density of the "Byron" key range=[(20−11+1−1)/4]−2=0.25. Thus, the potential insertion of "Albert Lea" into the RRN "10" impacts the RRN density of the "Byron" key range by reducing the number of deleted rows in the "Byron" key range by one and impacts the RRN density by increasing the RRN density by 0.25.

The impact on the "Stewartville" key range is the potential RRN density of the "Stewartville" key range, as impacted by the potential insertion at RRN "10" minus the current RRN density 820 of the "Stewartville" key range (entry 836)=(last RRN of the "Stewartville" key range−first RRN of the "Stewartville" key range+1−deleted count of the "Stewartville" key range)/(key count of the "Stewartville" key range)−the current density of the "Stewartville" key range=[(19−17+1−0)/2]−1=0.5. Thus, the potential insertion of "Albert Lea" into the RRN "10" impacts the RRN density of the "Stewartville" key range by reducing the number of deleted rows in the "Stewartville" key range by one and impacts the RRN density by increasing the RRN density by 0.5.

The potential insertion of "Albert Lea" into RRN "10" on the "Austin" key ranges impacts its RRN density by zero because the RRN "10" is outside of the "Austin" key range, so the DBMS 150 adds 0.25+0.5+0, to yield a sum of all the impacts of 0.75, of the potential insertion of the received key value at RRN "10."

Thus, the DBMS 150 has calculated a set of sums of RRN density impacts=(0.5 for RRN "6", 0.5 for RRN "8", 0 for RRN "10", 0.75 for RRN "14"). The DBMS 150 then selects the smallest or least of the set of sums, which is 0 for RRN "10" and inserts the received key value of "Albert Lea" into the selected row at RRN "10."

FIG. 10 depicts a block diagram of an example data structure for a symbol table 260-5 after insertion of a value into the database 230-3 (FIG. 9), according to an embodiment of the invention. The symbol table 260-5 comprises entries 1030, 1032, 1034, and 1036, each of which comprises a key value field 1000, a first RRN field 1012, a last RRN field 1014, a deleted count field 1016, a key count field 1018, and an RRN density field 1020. The DBMS 150 updated the deleted count 1016 in the entry 1032 to reflect that the row at RRN "10" is no longer deleted in the database 230-3 (FIG. 9).

Figure 11:
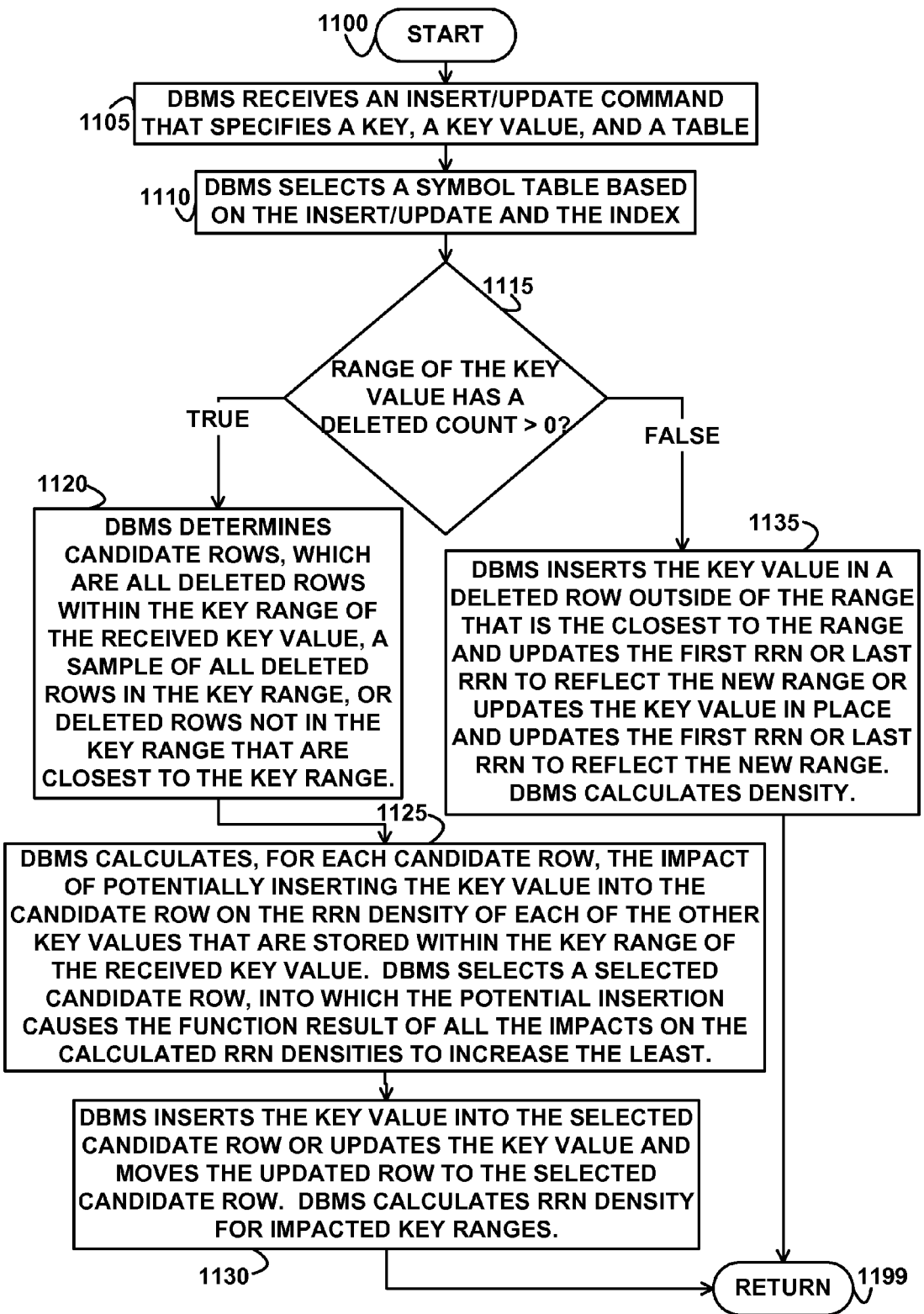
FIG. 11 depicts a flowchart of example processing for an insert or update command, according to an embodiment of the invention.

FIG. 11 depicts a flowchart of example processing for an insert or update command, according to an embodiment of the invention. Control begins at block 1100. Control then continues to block 1105 where the DBMS 150 receives, from the application 160, an insert or update command 158 that specifies a key, a key value, and a table.

Control then continues to block 1110 where the DBMS 150 selects a symbol table from among all of the symbol tables 260 based on the received insert or update command 158 and an index in the database that comprises the table. In an embodiment, if the insert or update command 158 specifies two or more keys or columns in the same table that have a multi-key index over them, then the DBMS 150 selects the symbol table with the two or more keys or columns. If the insert or update command 158 does not specify two keys or columns in the same table or the two keys or columns do not have a multi-key index over them, then the DBMS 150 selects a single column symbol table that is assigned to the key or column specified by the insert or update command 158. A multi-key index accepts, as input, multiple keys and key values and, in response, returns the relative record number of a row that comprises all of the key values in the identified keys or columns. A single key index accepts, as input, only one key and one key value.

Control then continues to block 1115 where the DBMS 150 determines whether a key range of the received key value(s) has a deleted count that is greater than zero. In an embodiment, the DBMS 150 makes the determination of block 1115 by finding an entry in the selected symbol table 260 with a key value(s) field that matches (is identical to) the key value specified by the received insert/update command 158 and by determining whether the deleted count field, in the same entry of the selected symbol table, specifies a value that is greater than zero.

If the determination at block 1115 is true, then the key range of the received key value has a deleted count that is greater than zero (the key range has at least one deleted row within the range), so control continues to block 1120 where the DBMS 150 finds candidate rows. In various embodiments, the candidate rows are all deleted (available) rows within the key range of the received key value, a sample of all deleted rows within the key range of the received key value, or all deleted rows that are not in the key range of the received key value and that are the closest to the key range (whose RRNs are within a threshold value of the key range). Control then continues to block 1125 where the DBMS 150 calculates, for each candidate row, the impact of potentially inserting the received key value into the candidate row on the RRN density of each of the other key values that are stored within the key range of the received key value. The DBMS 150 selects a selected candidate deleted row, into which the potential insertion causes the function result (in various embodiments, the function result is an arithmetic or logical function result, such as a sum, a maximum, an arithmetic product, a logarithmic function, or any combination or multiple thereof) of all the impacts on the calculated RRN densities to increase the least. That is, for each of the candidate rows, the DBMS 150 calculates a function result of the respective impacts on the respective RRN densities and selects a selected candidate row with the smallest function result. Thus, the DBMS 150 re-calculates the RRN density in each entry of the symbol table 260 with the deleted counts and the key counts updated to reflect the insertion of the key value into each deleted row. In an embodiment, the DBMS 150 reduces the number of candidate rows and stops calculating the impact of potentially inserting the received key value after a threshold amount of time has elapsed since the calculation started. In various embodiments, the DBMS 150 may receive various threshold amounts and/or values from a designer of the DBMS 150, from the application 160, from the user I/O device 121, or from the network 130.

Control then continues to block 1130 where the DBMS 150 inserts (stores) the key value into the selected candidate deleted row or updates (stores) the key value into a pre-existing non-deleted row and moves the updated row to the selected candidate deleted row, which causes the pre-existing row to become deleted and causes the candidate deleted row to no longer be deleted. The DBMS 150 updates the first RRNs, the last RRNs, the deleted counts and key counts in the symbol table 260 to reflect the insertion at the selected deleted row or to reflect the moving of the updated row to the selected deleted row. The DBMS 150 further re-calculates all of the RRN densities in the symbol table 260, using the updated deleted counts and key counts or re-calculates the RRN densities for key ranges that are impacted by the updated deleted counts and key counts. Control then continues to block 1199 where the logic of FIG. 11 returns.

If the determination at block 1115 is false, then key range of the received key value has a deleted count that is equal to zero (no deleted rows exist in the key range of the received key value), so control continues to block 1135 where the DBMS 150 inserts or stores the key value into a deleted row that is outside of the key range of the received key value and that is the closest to the key range (closest to the last RRN if the deleted row is after the last RRN or closest to the first RRN if the deleted row is before the first RRN) and updates the first RRN or last RRN of the key range to reflect the new key range that now comprises the formerly deleted row or updates the key value in place and updates the first RRN or last RRN to reflect the new range that now comprises the formerly deleted row. The DBMS 150 updates the first RRNs, the last RRNs, the deleted counts and key counts in the symbol table 260 to reflect the insertion at the selected deleted row and to reflect the moving of the updated row to the selected deleted row. The DBMS 150 further re-calculates all of the RRN densities in the symbol table 260, using the updated deleted counts and key counts. Control then continues to block 1199 where the logic of FIG. 11 returns.

Figure 12:
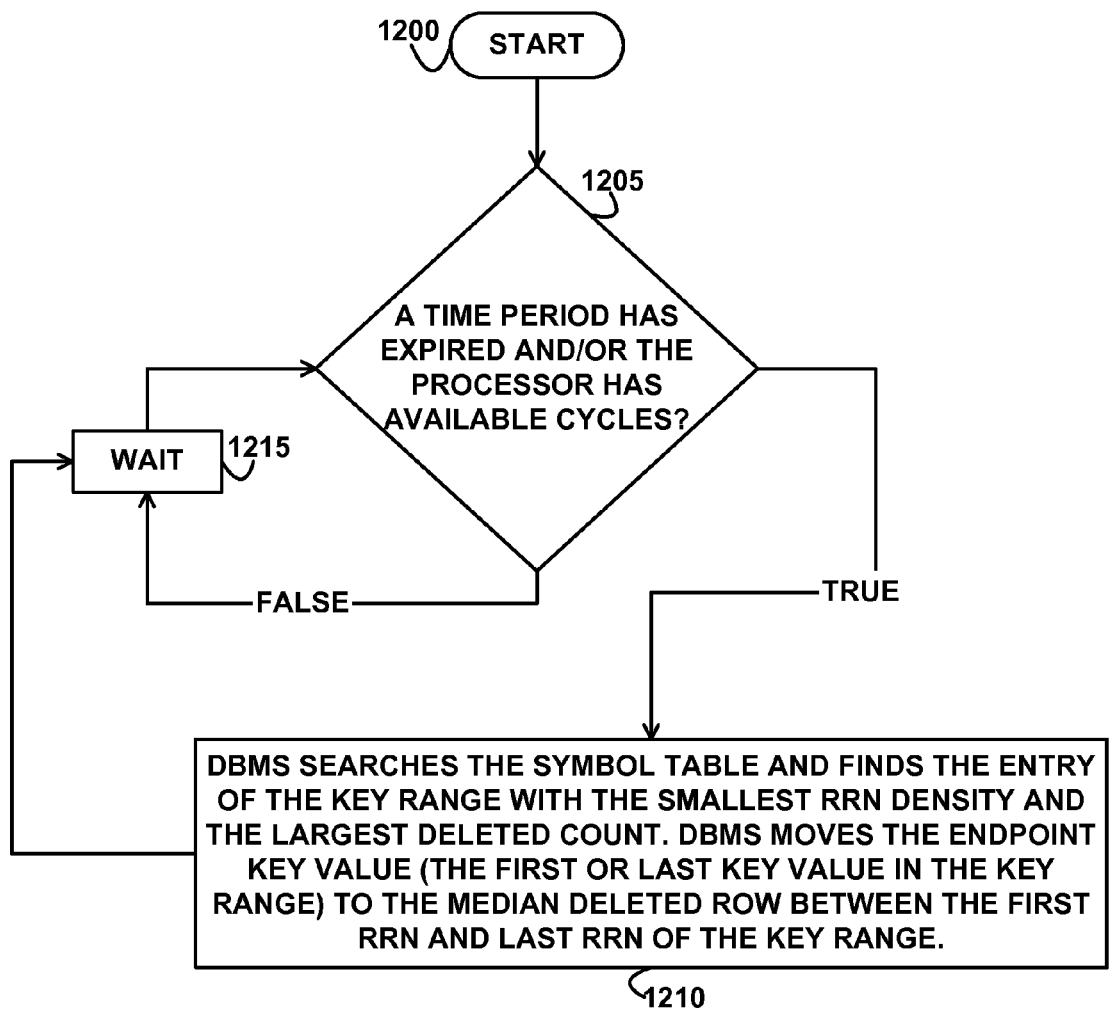
FIG. 12 depicts a flowchart of example processing for reorganizing a database table, according to an embodiment of the invention.

FIG. 12 depicts a flowchart of example processing for reorganizing a database table, according to an embodiment of the invention. In an embodiment, the logic of FIG. 12 executes concurrently, simultaneously, substantially simultaneously, or interleaved with the logic of FIG. 11, in the same or a different thread, task, or process, via multi-processing, multi-threading, or multi-programming techniques on the same or different of the processors 101. Control begins at block 1200. Control then continues to block 1205 where the DBMS 150 determines whether a time period has ended or elapsed and/or the processor 101 has available or free cycles not being used for other work. In various embodiments, the DBMS 150 receives the time period from the user I/O device 121 and stores the time period to the memory 102, or the time period is set by the designer of the DBMS 150.

If the determination at block 1205 is true, then a time period has ended or elapsed and/or the processor 101 has available cycles, so control continues to block 1210 where the DBMS 150 searches the symbol table 260 and finds the entry representing a key range with a combination of the smallest RRN density and the largest deleted count, or finds the key range entry with the smallest RRN density, or finds the key range entry with the largest deleted count. The DBMS 150 moves an endpoint row (in various embodiments, the first key value at the first RRN or the last key value at the last RRN) of the found key range to the median deleted row between the first RRN and the last RRN of the found key range. Control then continues to block 1215 where the DBMS 150 waits for the expiration of the time period and/or until such time as the processor 101 has available cycles. Control then returns to block 1205, as previously described above.

If the determination at block 1205 is false, then the time period has not ended or elapsed and/or the processor 101 does not have available cycles, so control continues to block 1215, as previously described above.

In this way, in an embodiment, the DBMS 150 increases the density of key values within key ranges, which increases the sequential nature of data stored within a database table, which increases performance by reducing the amount of time to read data from secondary storage and bring the data into memory and by reducing the number of times that data must be loaded into memory.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   receiving a first key value to be stored to a database table;
   responsive to receiving the first key value, finding a plurality of candidate rows in the database table, wherein no row of the plurality of candidate rows contains a valid key value, and wherein the first key value is capable of being stored in any row of the plurality of candidate rows;
   calculating, for each candidate row of the plurality of candidate rows, a corresponding plurality of respective impacts on a plurality of respective current densities of each of other key values that are stored within a first key range of the first key value,
   wherein the calculating the plurality of respective impacts comprises calculating potential densities of other key ranges minus the plurality of respective current densities of the other key ranges, wherein the first key range and the other key ranges overlap;
   for each candidate row of the plurality of candidate rows, calculating a respective function result of the corresponding plurality of respective impacts on the plurality of respective current densities;
   selecting a candidate row of the plurality of candidate rows with a smallest function result of the corresponding plurality of respective impacts on the plurality of respective current densities among all function results of the plurality of candidate rows;
   storing the first key value to the selected candidate row, wherein the storing further comprises:
   updating a row containing a valid key value with the first key value; and
   moving the updated row to the selected candidate row.

2. The method of claim 1, wherein the plurality of candidate rows are selected from a group consisting of: all rows without a valid key value within the first key range of the first key value, a sample of all rows without a valid key value within the first key range of the first key value, all rows without a valid key value that are within a threshold value of the first key range of the first key value, and wherein the calculating the plurality of function results of the plurality of respective impacts on the plurality of respective current densities further comprises calculating a plurality of sums of the plurality of respective impacts on the plurality of respective current densities.

3. The method of claim 1, wherein the calculating the corresponding plurality of respective impacts further comprises:
   calculating ((a respective last relative record number of the other key ranges minus a respective first relative record number of the other key ranges plus one minus a respective deleted count of the other key ranges, as impacted by potential insertion of the first key value) divided by (a respective key count of the other key ranges)) minus the plurality of current densities of the other key ranges.

4. The method of claim 1, further comprising:
   if the first key range of the first key value does not have any rows without a valid key value, inserting the first key value to a row without a valid key value that is closest to the first key range.

5. The method of claim 1, further comprising:
   periodically searching for a found key range with a smallest density and moving an endpoint row of the found key range to a median row without a valid key value within the found key range.

6. The method of claim 1, further comprising:
   periodically searching for a found key range with a largest deleted count and moving an endpoint row of the found key range to a median row without a valid key value within the found key range.

7. The method of claim 1, further comprising:
   performing the calculating the plurality of respective impacts, the calculating the plurality of function results, the selecting the selected candidate row, and the storing the first key value to the selected candidate row if the first key range of the first key value comprises at least one row without a valid key value.

8. A non-transitory computer-readable storage medium encoded with instructions, wherein the instruction when executed comprise:
   receiving a first key value to be stored to a database table;
   responsive to receiving the first key value, finding a plurality of candidate rows in the database table, wherein no row of the plurality of candidate rows contains a valid key value, and wherein the first key value is capable of being stored in any row of the plurality of candidate rows;
   calculating, for each candidate row of the plurality of candidate rows, a corresponding plurality of respective impacts on a plurality of respective current densities of each of other key values that are stored within a first key range of the first key value, wherein the calculating the plurality of respective impacts comprises calculating potential densities of other key ranges minus the plurality of respective current densities of the other key ranges, wherein the first key range and the other key ranges overlap;

for each candidate row of the plurality of candidate rows, calculating a plurality of respective function results result of the corresponding plurality of respective impacts on the plurality of respective current densities;

selecting a candidate row of the plurality of candidate rows with a smallest respective function result of the plurality of function results of the corresponding plurality of respective impacts on the plurality of respective current densities among all function results of the plurality of candidate rows; and storing the first key value to the selected candidate row, wherein the storing further comprises:

updating a row containing a valid key value with the first key value; and moving the updated row to the selected candidate row.

9. The non-transitory computer-readable storage medium of claim 8, wherein the plurality of candidate rows are selected from a group consisting of: all rows without a valid key value within the first key range of the first key value, a sample of all rows without a valid key value within the first key range of the first key value, and all rows without a valid key value that are within a threshold value of the first key range of the first key value, and wherein the calculating the plurality of function results of the plurality of respective impacts on the plurality of respective current densities further comprises calculating a plurality of sums of the plurality of respective impacts on the plurality of respective current densities.

10. The non-transitory computer-readable storage medium of claim 8, wherein the calculating the corresponding plurality of respective impacts further comprises:

calculating ((a respective last relative record number of the other key ranges minus a respective first relative record number of the other key ranges plus one minus a respective deleted count of the other key ranges, as impacted by potential insertion of the first key value) divided by (a respective key count of the other key ranges)) minus the plurality of current densities of the other key ranges.

11. The non-transitory computer-readable storage medium of claim 8, further comprising:

if the first key range of the first key value does not have any rows without a valid key value, inserting the first key value to a row without a valid key value that is closest to the first key range.

12. The non-transitory computer-readable storage medium of claim 8, further comprising:

periodically searching for a found key range with a smallest density and moving an endpoint row of the found key range to a median row without a valid key value within the found key range;

periodically searching for a found key range with a largest deleted count and moving an endpoint row of the found key range to a median row without a valid key value within the found key range; and performing the calculating the plurality of respective impacts, the calculating the plurality of function results, the selecting the selected candidate row, and the storing the first key value to the selected candidate row if the first key range of the first key value comprises at least one row without a valid key value.

13. A computer comprising:

a processor; and memory communicatively coupled to the processor, wherein the memory is encoded with instructions, wherein the instructions when executed by the processor comprise receiving a first key value, finding a plurality of candidate rows in a database table, wherein no row of the plurality of candidate rows contains a valid key value, calculating, for the plurality of candidate rows, a plurality of respective impacts on a plurality of respective current densities of each of other key values that are stored within a first key range of the first key value, wherein the calculating the plurality of respective impacts comprises calculating potential densities of other key ranges minus the plurality of respective current densities of the other key ranges, wherein the first key range and the other key ranges overlap, wherein the calculating the plurality of respective impacts further comprises calculating ((a respective last relative record number of the other key ranges minus a respective first relative record number of the other key ranges plus one minus a respective deleted count of the other key ranges, as impacted by potential insertion of the first key value) divided by (a respective key count of the other key ranges)) minus the plurality of current densities of the other key ranges, for the plurality of candidate rows, calculating a plurality of function results of the plurality of respective impacts on the plurality of respective current densities, selecting a candidate row of the plurality of candidate rows with a smallest function result of the plurality of function results of the plurality of respective impacts on the plurality of respective current densities, and storing the first key value to the selected candidate row, wherein the storing further comprises updating a row containing a valid key value with the first key value; and moving the updated row to the selected candidate row.

14. The computer of claim 13, wherein the plurality of candidate rows are selected from a group consisting of: all rows without a valid key value within the first key range of the first key value, a sample of all rows without a valid key value within the first key range of the first key value, and all rows without a valid key value that are within a threshold value of the first key range of the first key value, and wherein the calculating the plurality of function results of the plurality of respective impacts on the plurality of respective current densities further comprises calculating a plurality of sums of the plurality of respective impacts on the plurality of respective current densities.

15. The computer of claim 13, wherein the instructions further comprise:

if the first key range of the first key value does not have any rows without a valid key value, inserting the first key value to a row without a valid key value that is closest to the first key range.

16. The computer of claim 13, wherein the instructions further comprise:

periodically searching for a found key range with a smallest density and moving an endpoint row of the found key range to a median row without a valid key value within the found key range;

periodically searching for a found key range with a largest deleted count and moving an endpoint row of the found key range to a median row without a valid key value within the found key range; and performing the calculating the plurality of respective impacts, the calculating the plurality of function results, the selecting the selected candidate row, and the storing the first key value to the selected candidate row if the first key range of the first key value comprises at least one row without a valid key value.

\* \* \* \* \*